US011870253B2

(12) United States Patent
Ding et al.

(10) Patent No.: US 11,870,253 B2
(45) Date of Patent: Jan. 9, 2024

(54) ENERGY STORAGE SYSTEMS AND METHODS USING HETEROGENEOUS PRESSURE MEDIA AND INTERACTIVE ACTUATION MODULE

(71) Applicant: POWER8 TECH INC., Los Gatos, CA (US)

(72) Inventors: Lien Chun Ding, Taoyuan (TW); Qiu Shui Su, Maoming (CN); Song Yuan Lin, Shenzhen (CN); Chih Cheng Tai, Campbell, CA (US)

(73) Assignee: POWER8 TECH INC., Los Gatos, CA (US)

( * ) Notice: Subject to any disclaimer, the term of this patent is extended or adjusted under 35 U.S.C. 154(b) by 71 days.

(21) Appl. No.: 17/777,516

(22) PCT Filed: May 16, 2022

(86) PCT No.: PCT/US2022/029374
§ 371 (c)(1),
(2) Date: May 17, 2022

(87) PCT Pub. No.: WO2023/101718
PCT Pub. Date: Jun. 8, 2023

(65) Prior Publication Data
US 2023/0179016 A1 Jun. 8, 2023

(30) Foreign Application Priority Data
Dec. 3, 2021 (CN) .......................... 202111466565.5

(51) Int. Cl.
*H02J 15/00* (2006.01)
*F17C 5/06* (2006.01)
(52) U.S. Cl.
CPC .............. *H02J 15/006* (2013.01); *F17C 5/06* (2013.01); *F05B 2260/422* (2020.08);
(Continued)

(58) Field of Classification Search
CPC ........ Y02E 70/30; Y02E 10/20; H02J 15/003; H02J 15/006; H02J 2300/20
See application file for complete search history.

(56) References Cited

U.S. PATENT DOCUMENTS 2,652,690 A * 9/1953 Labriola ................. F03B 13/06
60/398
4,206,608 A * 6/1980 Bell .......................... F03D 9/17
290/55

(Continued)

FOREIGN PATENT DOCUMENTS

| CN | 103216426 B | 2/2016 |
| CN | 105043147 B | 1/2017 |

(Continued)

OTHER PUBLICATIONS

International Search Report in International Application No. PCT/US2022/029374, dated Aug. 24, 2022, 12 pages.

(Continued)

*Primary Examiner* — Thomas E Lazo
(74) *Attorney, Agent, or Firm* — Haverstock & Owens, A Law Corporation

(57) ABSTRACT

An energy storage system includes at least one heterogeneous pressure media and interactive actuation module ("module"), a liquid source, a pump, a converter, a first pipeline, and a second pipeline. The module includes a first container storing an initial gas and a second container storing an initial liquid. The liquid source stores a working liquid. The pump regulates the working liquid from the liquid source into the module. The initial liquid is driven by the working liquid to continuously compress the initial gas so that the first container stores a first pressure energy, and the initial gas is continuously expanded to drive the initial liquid to convert the first pressure energy into a second pressure energy. The second pressure energy through the (Continued)

first pipe drives the converter to generate an electrical energy, and the working liquid after driving the converter is returned to the liquid source through the second pipeline.

43 Claims, 10 Drawing Sheets

(52) U.S. Cl.
CPC .............. *F17C 2201/0104* (2013.01); *F17C 2201/0157* (2013.01); *F17C 2201/0161* (2013.01); *F17C 2223/0123* (2013.01)

(56) References Cited

U.S. PATENT DOCUMENTS

| | | | |
|---|---|---|---|
| 4,525,631 A | 6/1985 | Allison | |
| 6,718,761 B2* | 4/2004 | Merswolke | F03B 13/06 60/398 |
| 7,281,371 B1* | 10/2007 | Heidenreich | F03B 13/06 60/398 |
| 7,364,810 B2 | 4/2008 | Sridhar et al. | |
| 7,579,700 B1* | 8/2009 | Meller | F03B 17/005 290/43 |
| 7,663,255 B2* | 2/2010 | Kim | F02C 6/18 290/1 R |
| 7,878,280 B2 | 2/2011 | Sridhar et al. | |
| 8,037,678 B2 | 10/2011 | McBride et al. | |
| 8,127,542 B1* | 3/2012 | Dolcimascolo | F03B 17/005 60/398 |
| 8,240,956 B2 | 8/2012 | Lewis | |
| 8,723,347 B2 | 5/2014 | Crane et al. | |
| 8,739,533 B2 | 6/2014 | Yogev et al. | |
| 8,806,866 B2 | 8/2014 | McBride et al. | |
| 8,823,195 B2* | 9/2014 | Legacy | F03B 13/08 290/43 |
| 9,059,605 B2 | 6/2015 | Murray et al. | |
| 9,261,068 B2* | 2/2016 | Barakat | F03B 13/00 |
| 9,410,559 B2 | 8/2016 | VanWalleghem et al. | |
| 9,422,948 B2* | 8/2016 | Kim | F03B 13/00 |
| 9,444,378 B2* | 9/2016 | Fong | F17C 13/04 |
| 9,562,521 B2 | 2/2017 | Yogev | |
| 9,797,366 B2 | 10/2017 | Schmidt-Boecking et al. | |
| 10,203,735 B2 | 2/2019 | Gross et al. | |
| 10,205,323 B2* | 2/2019 | Lowell | H02J 3/381 |
| 10,344,741 B2* | 7/2019 | Sant | F03D 13/25 |
| 10,415,469 B2* | 9/2019 | Blount | F02C 6/06 |
| 10,655,505 B2 | 5/2020 | Matsukuma et al. | |
| 10,707,802 B1* | 7/2020 | Materna | H02S 20/32 |
| 10,823,132 B2 | 11/2020 | Mesinger et al. | |
| 10,836,579 B2 | 11/2020 | Yogev | |
| 10,837,429 B2 | 11/2020 | Pedretti et al. | |
| 10,859,207 B2 | 12/2020 | Lewis et al. | |
| 11,274,792 B2 | 3/2022 | Stradiotto et al. | |
| 11,387,707 B2 | 7/2022 | Yogev | |
| 11,404,935 B2 | 8/2022 | Yogev | |
| 2005/0155347 A1 | 7/2005 | Lewellin | |
| 2005/0279085 A1* | 12/2005 | Moore | F03B 13/185 60/398 |
| 2008/0136186 A1 | 6/2008 | Gogoana et al. | |
| 2009/0152871 A1* | 6/2009 | Ching | F03B 1/00 415/916 |
| 2010/0096858 A1 | 4/2010 | Riley | |
| 2010/0270801 A1 | 10/2010 | Liu | |
| 2011/0030361 A1* | 2/2011 | Gopalswamy | F16D 31/02 60/398 |
| 2011/0120673 A1 | 5/2011 | Xiang et al. | |
| 2011/0266804 A1* | 11/2011 | Dolcimascolo | F03B 17/04 415/916 |
| 2013/0134612 A1 | 5/2013 | Lewis et al. | |
| 2013/0220310 A1 | 8/2013 | Gregory et al. | |
| 2015/0211551 A1 | 7/2015 | VanWalleghem et al. | |
| 2016/0178129 A1 | 6/2016 | Chen et al. | |
| 2016/0201658 A1 | 7/2016 | Arapkoules | |
| 2019/0003384 A1 | 1/2019 | Bannari | |
| 2019/0052094 A1 | 2/2019 | Pmsvvsv et al. | |
| 2019/0221697 A1 | 7/2019 | Cho | |
| 2021/0075296 A1 | 3/2021 | Yogev | |
| 2021/0206574 A1 | 7/2021 | Yogev | |
| 2021/0221652 A1 | 7/2021 | Pedretti et al. | |
| 2021/0351615 A1 | 11/2021 | Yogev | |
| 2021/0388810 A1 | 12/2021 | Young et al. | |
| 2021/0404446 A1 | 12/2021 | Pedretti et al. | |
| 2022/0090585 A1 | 3/2022 | Lewis et al. | |
| 2022/0243701 A1 | 8/2022 | Pedretti et al. | |

FOREIGN PATENT DOCUMENTS

| | | |
|---|---|---|
| CN | 102797613 B | 3/2017 |
| CN | 104675680 B | 12/2017 |
| CN | 106677848 B | 3/2018 |
| CN | 106499612 B | 6/2018 |
| CN | 108571415 B | 12/2019 |
| CN | 111636991 A | 9/2020 |
| CN | 112360584 A | 2/2021 |
| CN | 112459980 A | 3/2021 |
| CN | 114934869 B | 8/2022 |
| JP | 0617555 A | 1/1994 |
| WO | 2011076926 A2 | 6/2011 |

OTHER PUBLICATIONS

Office Action in U.S. Appl. No. 17/892,676, dated Apr. 21, 2023, 7 pages.

* cited by examiner

ENERGY STORAGE SYSTEMS AND METHODS USING HETEROGENEOUS PRESSURE MEDIA AND INTERACTIVE ACTUATION MODULE

CROSS-REFERENCE TO RELATED APPLICATION(S)

This application claims is a national phase of PCT Application No. PCT/US22/29374 filed May 16, 2022 and claims priority to Chinese Patent Application No. 202111466565.5, filed Dec. 3, 2021 and titled, "ENERGY STORAGE SYSTEMS AND METHODS USING HETEROGENEOUS PRESSURE MEDIA AND INTERACTIVE ACTUATION MODULE," which are hereby incorporated by reference in their entireties.

FIELD OF THE INVENTION

The present invention relates to a field of green (renewable) energy power generation. Specifically, the present invention relates to energy storage systems and methods using a heterogeneous pressure media and interactive actuation module.

BACKGROUND OF THE INVENTION

Due to the recent demands for electrical energy, scientists have developed ways to generate electricity, such as generating electricity through combustion, nuclear transformation, nuclear fusion, sunlight, waterpower, and wind power.

Traditionally, coal and nuclear energy are used to generate electricity, but the carbon dioxide and the reactants used in the reaction of nuclear energy become environmental issues.

SUMMARY OF THE INVENTION

The present disclosure provides an energy storage system and method using heterogeneous pressure media and interactive actuation modules.

In some embodiments, an energy storage (e.g., a heterogeneous pressure media and interactive actuation module) is provided. The energy storage includes a first container for setting an initial gas and a second container for setting an initial liquid. When additional pressure (e.g., pumped fluid, such as water (e.g., working liquid)) is applied on the initial liquid, which in turn pressurizes the initial gas, the pressurized gas serves as an energy storage media. The processes of pressuring the gas and releasing of the pressure serve as a function of energy storage and release.

An embodiment, based on the aforementioned heterogeneous pressure media and interactive actuation module, uses a single module or a combination of multiple single modules to determine the output pressure.

An embodiment, based on the aforementioned heterogeneous pressure media and interactive actuation module, executes a first operation mode to store a first pressure energy and executes a second operation mode to convert the first pressure energy into a second pressure energy.

An embodiment, based on the aforementioned heterogeneous pressure media and interactive actuation module, includes a hole cover and a repair pipe for repairers to repair a first container and a second container.

An embodiment, based on the aforementioned heterogeneous pressure media and interactive actuation module, includes a pressure sensor to sense pressure.

An embodiment, based on the aforementioned heterogeneous pressure media and interactive actuation module, includes at least one of a pump to adjust fluid flow rates.

An embodiment, based on the aforementioned heterogeneous pressure media and interactive actuation module, includes a valve body with an open mode and a closed mode, whereby switching between the open mode and the closed mode, the first operation mode or the second operation mode is performed.

An embodiment, based on the aforementioned heterogeneous pressure media and interactive actuation module, includes a controller to operate the valve body to control the initial gas at a predetermined pressure, and the compression of the initial gas stops when the initial gas reaches the predetermined pressure.

An embodiment, based on the aforementioned heterogeneous pressure media and interactive actuation module, includes a controller to control the valve body and receive the sensing signal from the pressure sensor, so as to achieve the first operation mode and the second operation mode. The controller is configured to automatic switch between the operating modes.

An embodiment includes a heterogeneous pressure media and interactive actuation energy storage system, which connects a plurality of heterogeneous pressure media and interactive actuation modules, a liquid source and a converter through a first pipe and a second pipe, thereby using the pressurized initial gas to store energy by the flow-in of the working liquid. In the process of releasing the stored energy, the pressurized initial gas is released, which pushes the initial liquid to expel the working fluid out of the second container. The working fluid drive a power generator to generate electricity.

An embodiment includes a heterogeneous pressure media (e.g., different types or different densities of fluids) and interactive actuation energy storage method enabling repeatedly energy storing and releasing by using a heterogeneous pressure energy.

In order to achieve the functions and objectives of the foregoing embodiments or other objectives, the present disclosure provides a heterogeneous pressure media and interactive actuation module capable of executing a first operation mode and a second operation mode. When the first operation mode is executed, the heterogeneous pressure media and interactive actuation module receives a working fluid. When the second operation mode is executed, the heterogeneous pressure media and interactive actuation module is connected to a converter to push the working fluid to the converter. The heterogeneous pressure media and interactive actuation module includes a first container and a second container. The first container forms a first space to store an initial gas. The second container is disposed on one side of the first container. The second container is connected to the first container. In addition, the second container forms a second space to store an initial liquid. When the first operation mode is executed, the working liquid is injected into the second space, so that the working liquid drives the initial liquid to flow toward the first space, and then the initial gas is continuously compressed in the first space until the initial gas reaches a predetermined pressure, thereby allowing the first container to store a first pressure energy. When the second operation mode is executed, the pressurized initial gas continuously expands to drive the initial liquid to discharge back to the second container, which in turn pushes the working fluid out of the second container driving a converter to generate electricity.

In order to achieve the functions and objectives of the foregoing embodiments or other objectives, the present disclosure provides a heterogeneous pressure media and interactive actuation storage system. The heterogeneous pressure media and interactive actuation storage system includes a plurality of heterogeneous pressure media and interactive actuation modules, a liquid source, a pump, a converter, a first pipe, and a second pipe. Each of the heterogeneous pressure media and interactive actuation modules further includes a first container and a second container. The first container forms a first space to store an initial gas. The second container is disposed on one side of the first container. The second container is connected the first container. The second container forms a second space for storing an initial liquid. The liquid source (e.g., reservoir or water bank) stores a working liquid. The pump is disposed between the liquid source and the heterogeneous pressure media and interactive actuation module. The pump regulates the working liquid of the liquid source to enter the heterogeneous pressure media and interactive actuation module. The converter receives and outputs working fluid. The first pipe forms a third space. The first pipe has a plurality of connection ports, a first connection point and a third connection point. Each of the connection ports connects with each of the second spaces and each of the third spaces. The first connection point and the third connection point respectively connect with the third space. The first connection point and the third connection point are formed at the two ends of the first pipe. The first connection point is coupled to the first end of the liquid source while the third connection point is coupled to the first end of the converter. The second pipe forms a fourth space. A first end of the second pipe is coupled to a second end of the converter and a second end of the second pipe is coupled to a second end of the liquid source. When the first operation mode is executed, the working liquid from the liquid source is moved by the pump and injected into the second space through the first pipe, so that the working liquid drives the initial liquid to flow toward/into the first space, thereby continuously compressing the initial gas in the first space until the initial gas in the first space reaches a predetermined pressure, thereby allowing the first container to store a first pressure energy. When the second operation mode is executed, the initial gas is continuously expanded to drive the initial liquid to discharge to the first pipe to convert the first pressure energy into the second pressure energy. The initial liquid/working liquid then drives the converter through the first pipe to generate electrical energy. In a complete storing and releasing cycle, the working liquid passes through the second pipe after driving the converter to flow back to the liquid source (e.g., a releasing mode); thereafter, the pump injects the working liquid of the liquid source into the heterogeneous pressure media and interactive actuation module again (e.g., an energy storing mode).

In order to achieve the above objectives or other objectives, the present disclosure provides an energy storage method using heterogeneous pressure media and interactive actuation, including the steps of (a) providing an initial gas in a first container; (b) providing an initial liquid in a second container; (c) providing a working liquid into the second container driving the initial liquid to compress the initial gas and store a first pressure energy; (d) releasing the first pressure energy to drive the initial liquid to act on the working fluid to output a second pressure energy, and (e) repeatedly performing steps (c) to (d) to switch between the first pressure energy and the second pressure energy to store and output energy.

Compared with traditional electrical energy generation systems, the heterogeneous pressure media and interactive actuation module and the heterogeneous pressure media and interactive actuation energy storage system of the present disclosure may be a closed circulatory system. The present disclosure uses the initial gas and initial liquid as the medium for generating pressure energy, and the storage and release of pressure energy drives a converter (such as a converter) to generate electrical energy. In addition, the loss (such as heat loss) that may occur during the conversion process can quickly be compensated by merely adding/refilling the initial gas or fluid. The present disclosure has at least the following advantages:

(a) Easily obtainable raw materials: The initial gas, initial liquid, and working fluid used in the present disclosure are natural existing substances, such as water, ambient air and other substances, which can be easily obtained.

(b) Flexible planning of electrical energy: The present disclosure provides a modular design, which can be used to build micro, small, medium and large power plants according to actual electrical energy requirements to provide, for example, as small as kilowatts (kW) to gigawatts (GW) (and above) of electrical energy.

(c) Efficient use of space: The energy storage system of the present disclosure can be installed underground or under buildings and, hence, does not occupy the original use space and is capable of reducing the impact of the external environment.

(d) Safely generating electrical energy: The energy storage system of the present disclosure does not use dangerous substances and thus can be installed in residential houses, schools, cities, public facilities, and other fields.

(e) Low maintenance cost: The present disclosure uses substances that can be easily obtained from the environment, such as water, ambient air and other substances. Therefore, when the efficiency is reduced, the original energy storage and discharge efficiency can be restored simply by adding/refilling at least one of the initial gas, initial liquid, and working fluid, without the need to purchase natural gas, coal, and nuclear transformation, materials, etc.

(f) Automatic control systems: The present disclosure provides a controller to switch between the first operation mode and the second operation mode using the control valve to manipulate and control the movement of the initial gas, the initial liquid, and the working liquid.

(g) Power grid compatibility: The present disclosure drives the converter to generate electrical energy (or electricity) through energy (such as pressure energy, hydraulic energy, etc.), which can directly transmit/transfer the electrical energy to the existing power grid system, and can be used as the main source of power or as backup power in the power grid system.

(h) Residual power storage and conversion: The present disclosure stores residual/unused power or backup power for emergency supplemental use, which is collectively referred to herein as residual electricity. The present disclosure uses residual power to drive pumps, so as to convert residual electricity into pressure energy by the heterogeneous pressure media and interactive actuation module to achieve the effect of storing residual electricity. The present disclosure can instantly convert the pressure energy into electrical energy to make up for the insufficient electricity any time according to the increased demand of electricity.

Other embodiments, aspects, features, and advantages will become apparent from the reminder of the disclosure as a whole.

DETAILED DESCRIPTION OF THE PREFERRED EMBODIMENTS

In order to fully understand the purpose, features and effects of the present invention, the following specific embodiments are used in conjunction with the accompanying drawings to give a detailed description of the present invention. The description is as follows:

In this specification, "a" or "an" is used to describe the units, elements and components described herein. This is just for the convenience of illustration and provides a general meaning to the scope of the present invention. Therefore, unless clearly stated otherwise, this description should be understood to include one or at least one, and the singular number also includes the plural number.

In this specification, the terms "include", "comprise", "have" or any other similar terms are intended to cover non-exclusive inclusions. For example, an element, structure, product or device that contains a plurality of features is not limited to the requirements listed herein, but may include those features that are not explicitly listed but are generally inherent in the element, structure, product or device. In addition, unless there is a clear statement to the contrary, the term "or" refers to the inclusive "or" rather than the exclusive "or".

Figure 1:
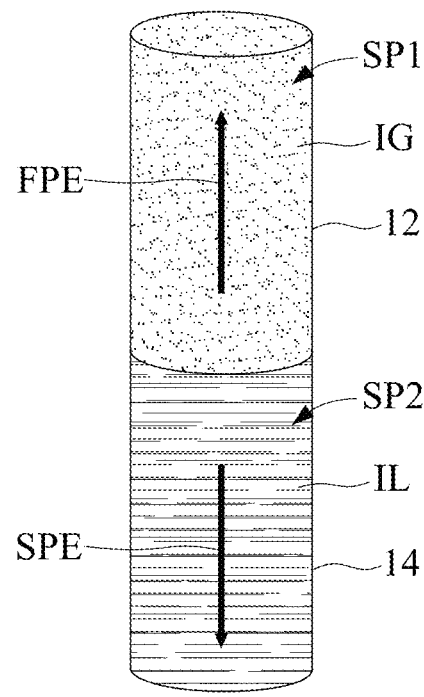
FIG. 1 is a three-dimensional schematic diagram of an energy storage in accordance with some embodiments.
Figure 2A:
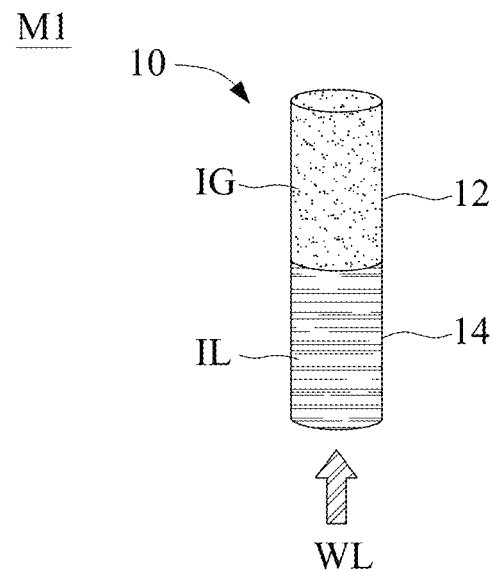
FIG. 2A is a schematic diagram illustrating the operation of the energy storage executing a first operation mode of FIG. 1 in accordance with some embodiments.

FIG. 1 is a three-dimensional schematic diagram of an energy storage 10 in accordance with some embodiments. In FIG. 1, the energy storage 10 comprises a heterogeneous pressure media and interactive actuation module that executes a first operation mode M1 and a second operation mode M2. FIG. 2A is a schematic diagram illustrating the operation of the energy storage 10 executing the first operation mode M1, and FIG. 2B is a schematic diagram illustrating the operation of the energy storage 10 executing a second operation mode M2.

When the first operation mode M1 is executed, the energy storage 10 receives a working fluid WL. When the second operation mode M2 is executed, the energy storage 10 pushes the working fluid WL to a converter (such as converter 4 illustrated in FIG. 4B) that is communicatively coupled with the energy storage 10. The converter can be a liquid pump, a turbo pump, a liquid generator, a liquid turbine generator, a hydraulic turbine generator, or the like. In an embodiment, the first operation mode M1 and the second operation mode M2 are operated during different time periods. For example, the first operation mode M1 is executed during the off-peak electricity consumption period, and the second operation mode M2 is executed during the peak electricity consumption period. However, in an embodiment, for example, when there are multiple energy storages, the multiple energy storages may operate in different modes. For example, a first energy storage may be executing the first operation mode M1, while a second energy storage may be executing the second operation mode M2. As such, the first operation mode M1 and the second operation module M2 can be executed simultaneously.

As illustrated in FIG. 2A, when the first operation mode M1 is executed, the working fluid WL is injected into the energy storage 10. The working fluid WL may come from a liquid source. For example, the liquid source may be a water tank, a reservoir, a water tower, etc., which can serve as a device or equipment for storing the working fluid WL. The arrow illustrated in FIG. 2A represents the flow path of the working fluid WL during the first operation mode M1.

Figure 2B:
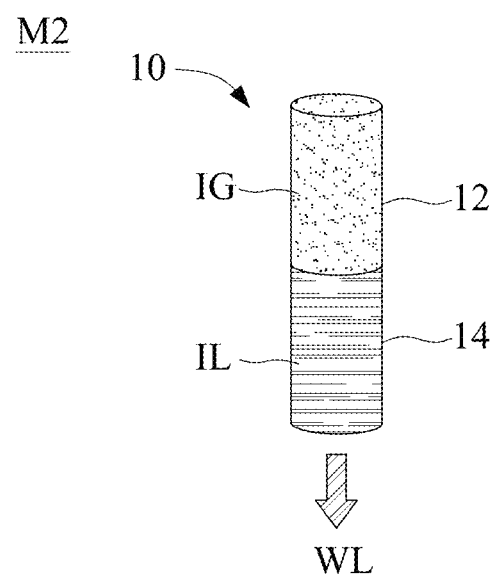
FIG. 2B is a schematic diagram illustrating the operation of the energy storage executing a second mode of operation of FIG. 1 in accordance with some embodiments.

As illustrated in FIG. 2B, when the second operation mode M2 is executed, the working fluid WL is discharged from the energy storage 10. In this manner, the working fluid WL can be discharged to the converter to drive the converter for operation and generating electricity. The arrow illustrated in FIG. 2B illustrates the flow path of the working fluid WL during the second operation mode M2.

The working fluid WL can be water, in accordance with some embodiments. However, other fluids or liquids are also within the scope of the present disclosure, such as organic solvents, inorganic solvents, molten salts, fluid ionic salts, supercritical fluids, and various gases or other flowable substances or pressure-generating substances and mechanisms, etc.

Referring back to FIG. 1, the energy storage 10 includes a first container 12 and a second container 14. As illustrated, in an embodiment, the energy storage 10 includes a one-to-one correspondence of first container to second container. Although the first container 12 and the second container 14 are herein referred to as containers, such term should not be used to limit the scope to a specific shape; a container can have any shape as long as it can be used to contain liquid, gas or solid and can bear the generated pressure thereof at the same time. In addition, the material and thickness of the first container 12 and the second container 14 can also affect/determine the applicable pressure, liquids, gases, or solids. For example, the material can be stainless steel, iron, or the like. In addition, the energy storage 10 may be installed underground or enclosed by other materials (such as cement, concrete, etc.). For example, when the first container 12 and the second container 14 are encapsulated by cement, the first container 12 and the second container 14 can increase the strength of resistance against pressure. In other words, the enclosure by cement or concrete can reduce the thickness/material requirements of the walls of the containers. Similarly, an underground system of the present disclosure also reduces the thickness/material requirements of the walls of the containers.

The first container 12 forms a first space SP1 to store an initial gas IG. In FIG. 1, the first container 12 is illustrated with a cylindrical tank body as an example. However, the first container 12 may also be a polygonal tank body, a honeycomb-shaped tank body or another shaped-tank body.

In some embodiments, the initial gas IG contains air, other fluids or gases, which are also within the scope of the embodiments, such as hydrogen, helium, nitrogen or mixed gases (such as 20% hydrogen and 80% helium), etc., as well as various gases or other flowable substances or substances and mechanisms that can generate pressure. In addition, the initial gas IG may also be transformed from other material states. For example, the gas state is transformed from a solid-state or a liquid state. The foregoing transformation may occur, for example, through changes in temperature, pressure, etc. In some embodiments, the initial gas IG may not only stay in the first space SP1 but may also appear in the second space SP2. Moreover, the initial gas IG may not fill the entire first space SP1. In some embodiments, in addition to filling the entire first space SP1, the initial gas IG may also fill a part of the first space SP1.

The second container 14 is disposed on one side of the first container 12. In FIG. 1, the second container 14 is disposed on the lower side of the first container 12 as an example. In other embodiments, the second container 14 may be disposed on either side the first container 12; that is, it is not limited to be disposed on the lower side of the first container 12. The second container 14 forms a second space SP2 to store an initial liquid IL. After the second container 14 is connected to the first container 12, the second space SP2 connects with the first space SP1. In FIG. 1, the second container 14 is also illustrated with a cylindrical tank body as an example, and the description of the second container 14 is the same as the description of the first container 12, which will not be repeated here for the sake of brevity and clarity. The shape of the second container 14 may be the same as or different from the shape of the first container 12. In some embodiments, the initial liquid IL may not only stay in the second space SP2 but also appear in the first space SP1. Moreover, in addition to filling the entire second space SP2, the initial liquid IL may also only fill a part of the second space SP2.

In some embodiments, the initial liquid IL may be water. Other fluids or liquids are also within the scope of the embodiments of the present invention, such as organic solvents, inorganic solvents, molten salts, fluid ionic salts, supercritical fluids, and various gases or other flowable substances or pressure-generating substances and mechanisms, etc. Furthermore, the material used for the initial liquid IL may be the same or different from that of the working liquid WL. In addition, the initial liquid IL may also be transformed from other material states, for example, the liquid state is transformed from a solid state or a gas state. The foregoing transformation may occur, for example, through changes in temperature, pressure, etc.

Figure 3:
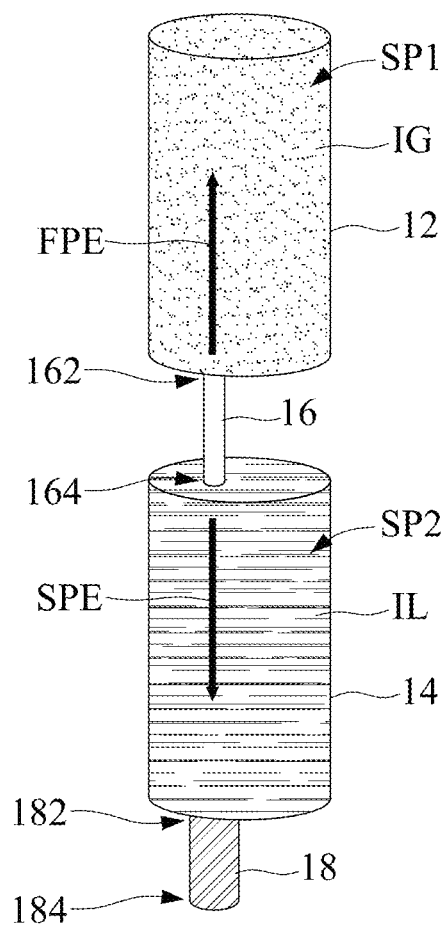
FIG. 3 is a three-dimensional schematic diagram of the energy storage in accordance with some embodiments.
Figure 4A:
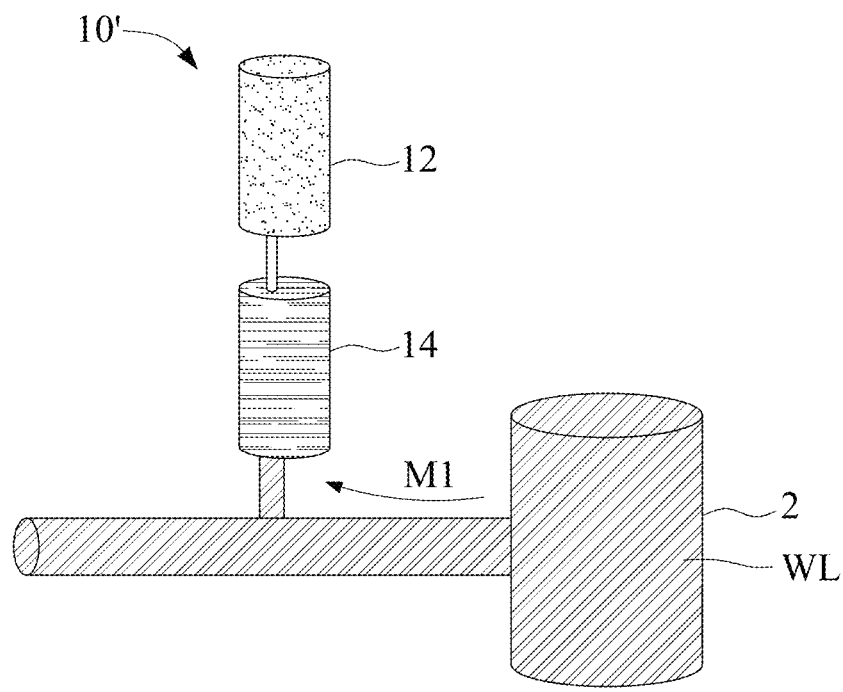
FIG. 4A is a schematic diagram illustrating the operation of the energy storage of FIG. 3 in accordance with some embodiments.
Figure 4B:
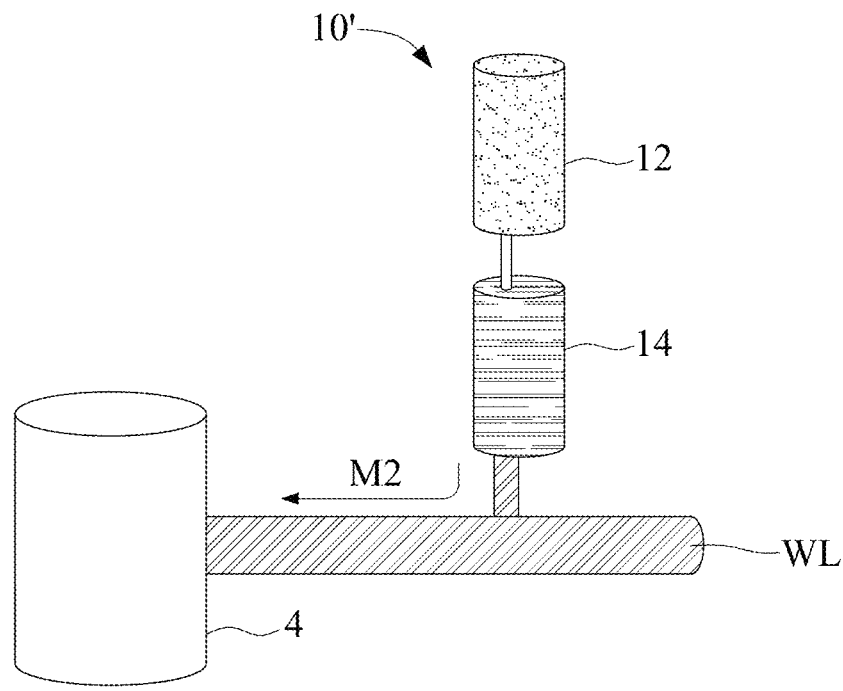
FIG. 4B is a schematic diagram illustrating the operation of the energy storage executing a second operation mode of FIG. 3 in accordance with some embodiments.

As an illustration, referring to FIG. 4A and FIG. 4B, when the first operation mode M1 is executed, the working fluid WL is continuously injected into the second space SP2 (as shown in FIG. 4A). The injected working fluid WL gradually increases the space occupied in the second space SP2 by gradually increasing the volume in the second space SP2, thereby driving the initial liquid IL to continuously compress the initial gas IG in the first space SP1, until the initial gas IG in the first space SP1 reaches a predetermined pressure, causing the first container 12 to reach and store a first pressure energy FPE (as illustrated in FIG. 3). Since the distance between the molecules of the initial gas IG is reduced due to the expansion of the initial liquid IL, the initial gas IG is compressed to achieve the effect of energy storage. The value of the predetermined pressure can range from several kilopascals to several megapascals. For example, the value of the predetermined pressure may range from 4 megapascals (Mpa) (or N/m2) to 12 Mpa. As long as the initial liquid IL thrust continues to occur, the initial gas IG will continue to be compressed until the initial liquid IL no longer pushes the initial gas IG due to pressure balance or the initial gas IG can no longer be compressed. It is then that the gas IG will stop being compressed. In addition, the pressure of the initial gas IG can be reached or maintained at a predetermined pressure by adjusting the initial liquid IL to push the initial gas IG, thereby determining the amount of the first pressure energy FPE.

When the second operating mode M2 is executed, the working fluid WL is discharged from the second space SP2 toward the opposite direction (as shown in FIG. 4B). At this time, the initial fluid IL is pushed by the first pressure energy FPE, causing the working fluid WL to squeeze to move in the direction toward, for example, the converter 4, which originates from the effect of pressure release caused by the continuous expansion of the compressed initial gas IG. In other words, the initial gas IG drives the initial liquid IL to discharge, so as to convert the first pressure energy FPE into a second pressure energy SPE to drive the converter 4. In essence, the converter 4 is acted on by the second pressure energy SPE to generate electrical energy E (or electricity).

In an embodiment, the energy storage 10, working on a pressure therebetween maintained at several MPa to tens of MPa, can generate electricity ranging from 30 kW (kilowatt) to 300 kW. For example, a single energy storage generates approximately 300 kW. Approximately 750,000 kW of electricity can be generated when 2,500 energy storages are used in a system.

FIG. 3 is a three-dimensional schematic diagram of an energy storage 10' in accordance with some embodiments. In FIG. 3, in addition to the first container 12 and the second container 14 described above, the energy storage 10' further includes a first tube 16 and a second tube 18. By means of the arrangement of the first tube 16 and the second tube 18, the arrangement of the first container 12 and the second container 14 are more flexible.

The descriptions of the first container 12 and the second container 14 are provided above and will not be repeated here for the sake of brevity and clarity.

In FIG. 3, the first tube 16 includes a first end 162 and a third end 164. The first end 162 is coupled to the first container 12 and the third end 164 is coupled to the second container 14 so that the first tube 16 communicates with the first space SP1 and the second space SP2.

The second tube 18 provides a second end 182 and a fourth end 184. The second end 182 is coupled to the second container 14 and the fourth end 184 can be connected to the converter 4 (as shown in FIG. 4B) and the liquid source 2 (as shown in FIG. 4A). In an embodiment, the diameter of the second tube 18 is larger than the diameter of the first tube 16. In another embodiment, the diameter of the second tube 18 may also be equal to or smaller than the diameter of the first tube 16. When the diameter of the second tube 18 is larger than the diameter of the first tube 16, the initial liquid IL accelerates the compression of the initial gas IG via the first tube 16.

The descriptions of the energy storage 10' executing the first operation mode M1 and the second operation mode M2 are provided above and will not repeated here for the sake of brevity and clarity. FIG. 4A is a schematic diagram illustrating the operation of the energy storage 10' executing the first operation mode M1. FIG. 4B is a schematic diagram illustrating the operation of the energy storage 10' executing the second operation mode M2.

In an embodiment, technical features of the first tube 16 and the second tube 18 of FIG. 4A and FIG. 4B can be used to adjust the first operation mode M1 and the second operating mode M2 as follows:

In the first operation mode M1, the working liquid WL from the liquid source 2 is continuously injected into the second space SP2 via the second tube 18, so that the working liquid WL drives the initial liquid IL through the first tube 16 to continuously compress the initial gas IG in the first space SP1 until the initial gas IG in the space SP1 has a predetermined pressure, and so that the first container 12 stores the first pressure energy FPE. Since the distance between the molecules of the initial gas IG is reduced by the initial liquid IL, the initial gas IG is compressed to achieve energy storage.

In the second operation mode M2, the working fluid WL is no longer continuously injected into the second space SP2 through the second tube 18 but is discharged from the second tube 18 in the reverse direction. At this time, the compressed initial gas IG continuously expands to cause the initial liquid IL to be pushed by the first pressure energy FPE to cause the working liquid WL to push toward the converter 4. Thus, the initial gas IG drives the initial liquid IL moving toward and discharges from the fourth end 184 of second tube 18, so as to convert the first pressure energy FPE into a second pressure energy SPE, which drives the converter 4. The converter 4, that is driven by the second pressure energy SPE, generates electrical energy E (e.g., electricity).

Figure 5:
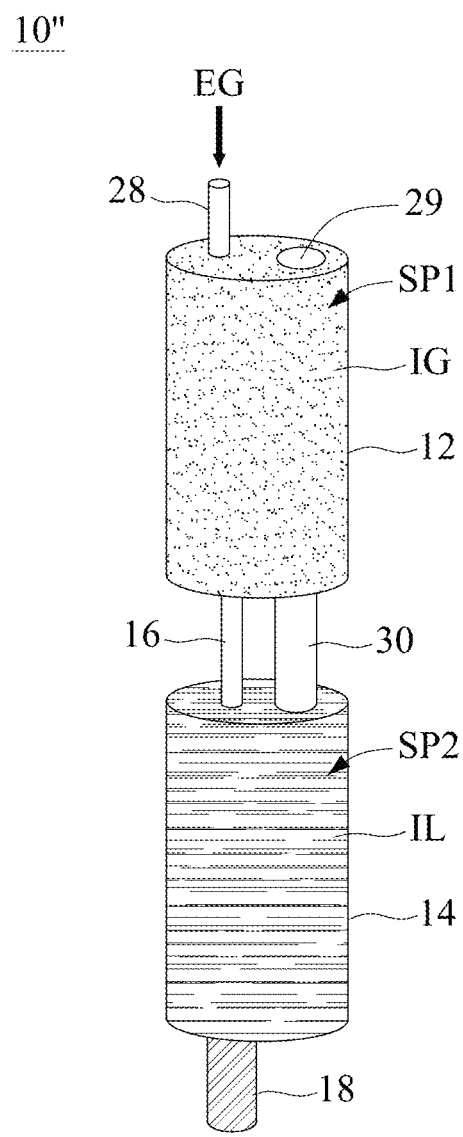
FIG. 5 is a three-dimensional schematic diagram of the energy storage in accordance with some embodiments.

FIG. 5 is a three-dimensional schematic diagram of an energy storage 10" in accordance with some embodiments. In FIG. 5, the energy storage 10" not only includes the first container 12, the second container 14, the first tube 16 and the second tube 18, as shown in FIG. 3, but also includes a third tube 28, a hole cover 29 and a maintenance pipe 30.

The descriptions of the first container 12, the second container 14, the first tube 16, and the second tube 18 are provided above and will not be repeated here for the sake of brevity and clarity.

The third tube 28 is disposed at the first container 12. One end of the third tube 28 is coupled to the first space SP1 and the other end of the third tube 28 is for receiving the external gas EG to supply the initial gas IG. In an embodiment, the third tube 28 further includes a pressure safety valve (also called a pop-up valve) (not shown) used for selectively releasing gas or liquid to release the pressure, so as to adjust the pressure to reach the predetermined pressure setting value. For example, the pressure safety valve is controlled to maintain a predetermined pressure of the energy storage at 4 MPa (or N/m2) to 12 MPa.

The hole cover 29 is disposed at the first container 12. Opening the hole cover 29 connects the first space SP1 with the outside space of the first container 12. Closing the hole cover 29 blocks the connection between the first space SP1 and the outside space of the first container 12. Maintenance can be performed by a person (not shown in the figure) entering the first space SP1. In an embodiment, the hole cover 29 may further include a pressure safety valve (also called a pop-up valve) (not shown) used for selectively releasing gas or liquid to release pressure, so as to adjust the pressure safety valve so that the pressure of the first container 12 is maintained at a predetermined pressure setting the value of, for example, several megapascals and several megapascals.

The maintenance pipe 30 is disposed between the first container 12 and the second container 14. Opening the maintenance pipe 30 connects the first space SP1 and the second space SP2. Closing the maintenance pipe 30 blocks the connection between the first space SP1 and the second space SP2. A maintenance person (not shown in figure) is allowed to enter the second space SP2 for maintenance. In an embodiment, the maintenance pipeline 30 may further include a pressure safety valve (also called a pop-up valve) (not shown) used for selectively releasing gas or liquid to release the pressure, so as to be able to adjust the pressure to reach a predetermined pressure setting value.

In an embodiment, the energy storage 10" may further include a pressure sensor, a pump, a valve body, a controller, etc., which are described in detail below.

Figure 6:
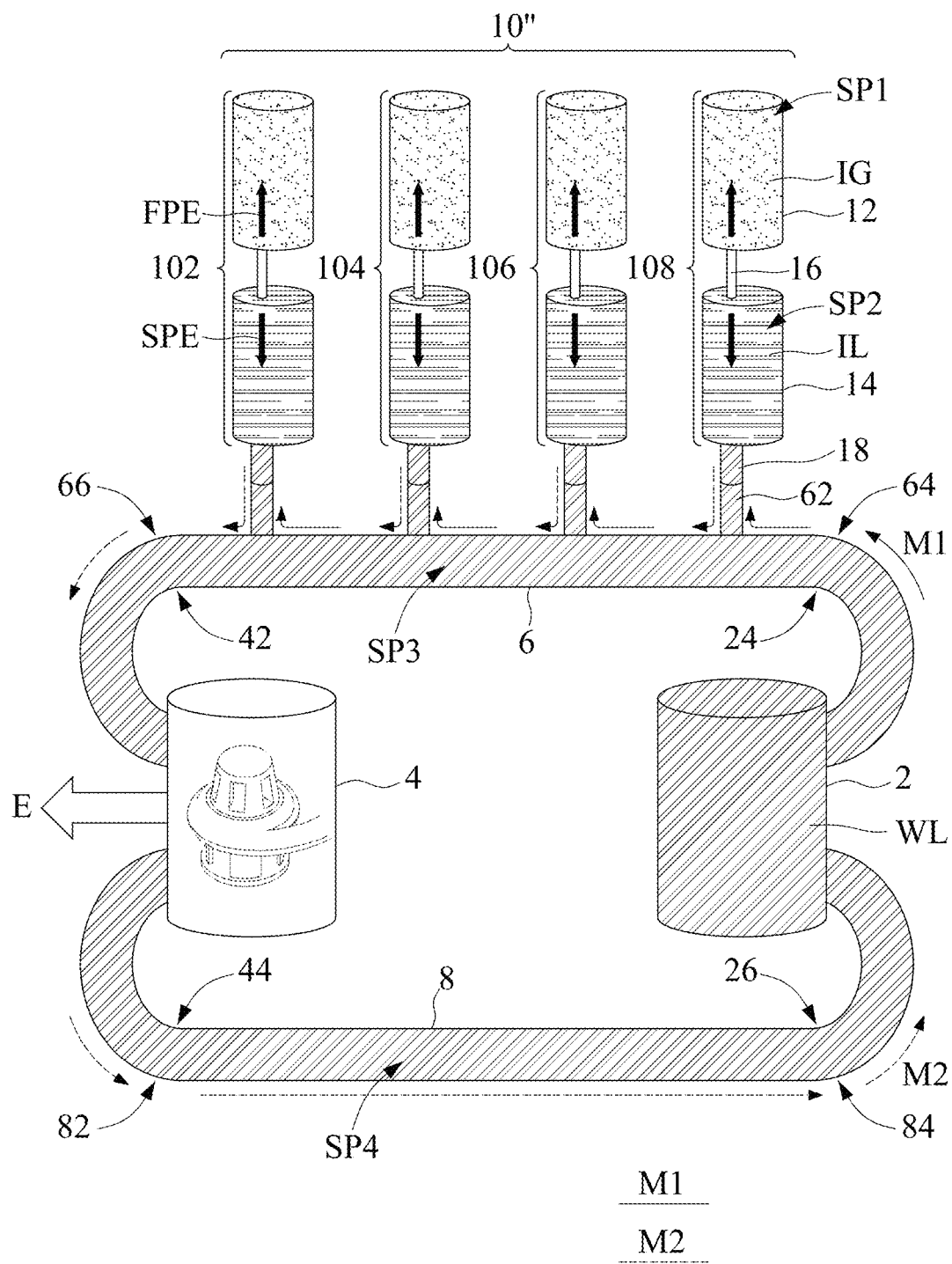
FIG. 6 is a three-dimensional schematic diagram of the energy storage system in accordance with some embodiments.

FIG. 6 is a three-dimensional schematic diagram of an energy storage system 20 in accordance with some embodiments. As shown in FIG. 6, a heterogeneous pressure media and interactive actuation energy storage system 20 includes a plurality of energy storages 10", a liquid source 2, a converter 4, a first pipe 6, and a second pipe 8. The energy storage 10", the liquid source 2, the converter 4, the first pipe 6 and the second pipe 8 form a closed and circulating energy storage and release structure, according to a flow path of the working fluid WL.

In FIG. 6, there are four energy storages 102, 104, 106 and 108. However, there may be more or less energy storages in the storage system 20. In an embodiment, the number of energy storages can be selected arbitrarily or according to application specifics. For example, the range of the number may be between 10 and 100 energy storages 10", between 100 and 1,000 energy storages 10", or between 1,000 and 999,999 energy storages 10". Each of the energy storages 102, 104, 106 and 108 respectively includes a one to one correspondence of first container 12 to a second container 14, a first tube 16 and a second tube 18. In some embodiments, the energy storages 102, 104, 106 and 108 may be added to or removed from the heterogeneous pressure media and interactive actuation energy storage system 20 in real-time or on-demand. Or, the energy storages 102, 104, 106 and 108 may be controlled through the valve body to activate for operation (deemed as added) or de-activate for non-operation (deemed as removed) in the energy storage system 20.

Each first container 12 forms a first space SP1 to store an initial gas IG.

Each second container 14 is disposed on the lower side of a first container 12, and the respective second container 14 forms a second space SP2 to store an initial liquid IL.

One end of each first tube 16 is coupled to a first container 12 and the other end of the respective first tube 16 is coupled to a second container 14, so that the first tube 16 connects with the first space SP1 of the coupled first container 12 and the second space SP2 of the coupled second container 14.

One end of each second tube 18 is coupled to a second container 14 and the other end of the second tube 18 is coupled to the first pipe 6. The diameter of the second tube 18 may be larger or smaller than the diameter of the first tube 16.

The liquid source 2 supplies and recycles the working liquid WL. For example, the liquid source 2 may be a reservoir, a water tower, a reservoir, and the like. The description of the function of the liquid source 2 functioning as a supply is provided above will not be repeated here for the sake of brevity and clarity. Here, in addition to the function of supply, the liquid source 2 can also recycle the working fluid WL outputted by the converter 4 through the second pipe 8.

The converter 4 receives and outputs the working fluid WL. For example, the converter 4 may be a liquid pump, a turbo pump, a liquid generator, a liquid turbine generator, a hydro turbine generator, or other liquid driven device configured to generate electricity. The converter 4 can function as a supply, reference may be made to the description of the prior embodiment, which will not be repeated here. Here, in addition to the function of supplying, the liquid source 2 can also recycle the working liquid WL outputted from the converter 4 through the second pipe 8.

The first pipe 6 forms a third space SP3, and the first pipe 6 has a plurality of connection ports 62, a first connection point 64, and a third connection point 66. Each of the connection ports 62 connects each of the second spaces SP2 of the second containers 14 and the third space SP3. In addition, the first connection point 64 and the third connection point 66 are formed at the two ends of the first pipe 6. The first connection point 64 is coupled to the first end 24 of the liquid source 2 and the third connection point 66 is coupled to the first end 42 of the converter 4.

The second pipe 8 forms a fourth space SP4, and a first end 82 of the second pipe 8 is coupled to a second end 44 of the converter 4 and a second end 84 of the second pipe 8 is coupled to the second end 26 of the liquid source 2.

In the first operation mode M1, the working liquid WL from the liquid source 2 is injected into the second spaces SP2 through the first pipe 6 and the second tubes 18, so that the working liquid WL drives the initial liquid IL through the first tubes 16 to continuously compresses the initial gas IG in the first spaces SP1 until the initial gas IG acting on the first spaces SP1 have a predetermined pressure, thereby enabling the first containers 12 to store a first pressure energy FPE.

In the second operation mode M2, the initial gas IG continuously expands to drive the initial liquid IL moving toward and discharge from the second tubes 18 to convert the first pressure energy FPE into a second pressure energy SPE and pass through the first pipes 6 to drive the converter 4 to generate an electrical energy E. The working liquid WL, after driving the converter 4, returns to the liquid source 2 through the second pipe 8.

Figure 7:
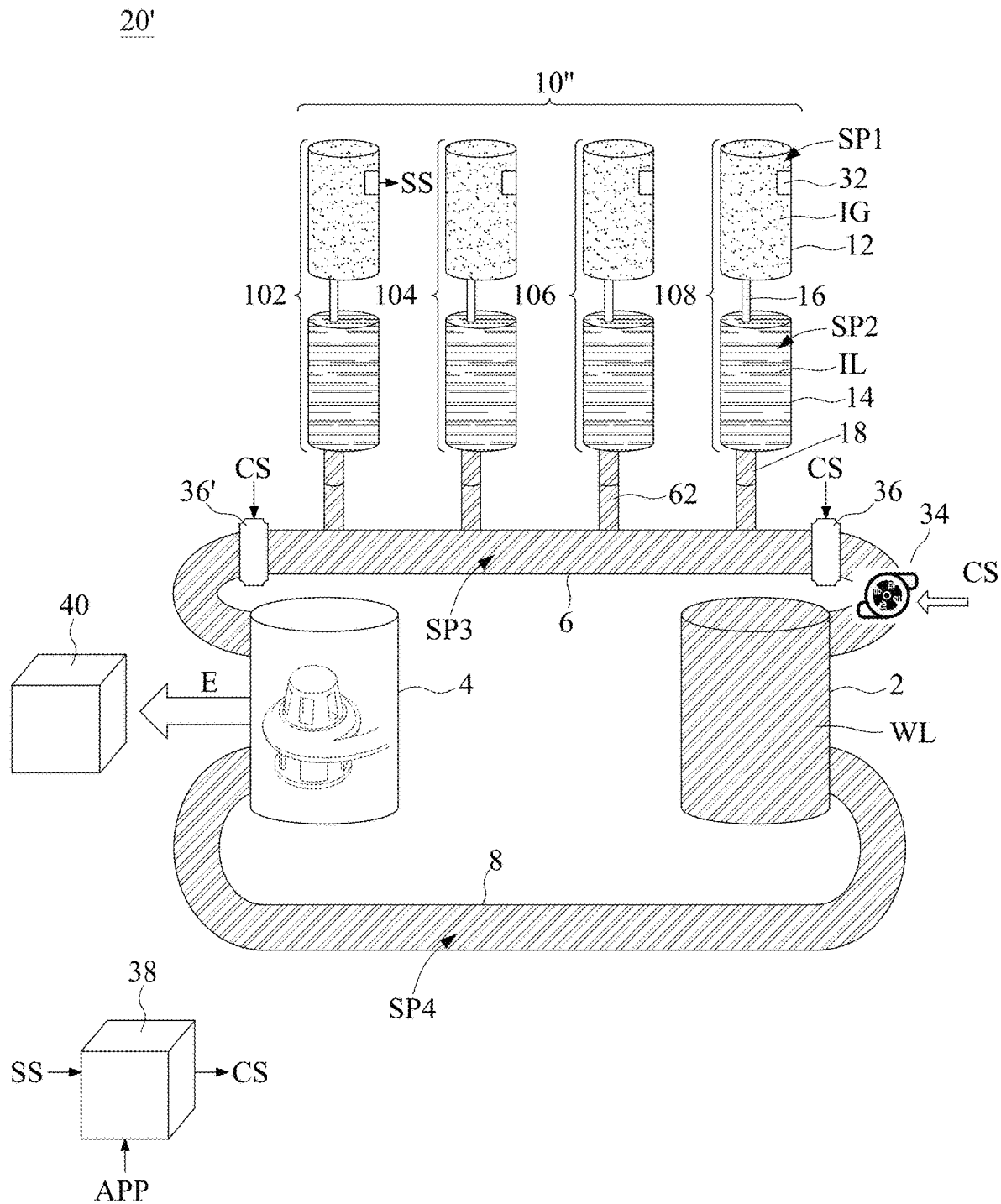
FIG. 7 is a three-dimensional schematic diagram of the energy storage system in accordance with some embodiments.

FIG. 7 is a three-dimensional schematic diagram of an energy storage system 20' in accordance with some embodiments. In FIG. 7, the energy storage system 20' includes not only the energy storage 10", the liquid source 2, the converter 4, the first pipe 6 and the second pipe 8, but the energy storage system 20' also includes at least one pressure sensor 32, a pump 34, valve bodies 36, 36', and a controller 38. The controller 38 can be implemented on a server computer, which broadly represents one or more computers, such as one or more desktop computers, server computers, a server farm, a cloud computing platform, a parallel computer, virtual computing instances in public or private datacenters, and/or instances of a server-based application. The pump 34 enables the heterogeneous pressure media and interactive actuation energy storage system to have a better energy storage effect, storing and releasing more energy.

The descriptions of the energy storage 10", the liquid source 2, the converter 4, the first pipe 6 and the second pipe 8 are provided above and will not be repeated here for the sake of brevity and clarity.

The pressure sensor 32 can be used to sense, for example, changes in the working fluid WL, the initial liquid IL or the initial gas IG and generate a corresponding sensing signal SS. Here, the pressure sensor 32 is disposed at the first containers 12, as an example. In other embodiments, the pressure sensor 32 may also be disposed at at least one of the second containers 14, the first tube 16, the second tube 18, the first pipe 6, and the second pipe 8.

The pump 34 can be used to adjust, for example, the flow rate of the working liquid WL or the initial liquid IL. The pump 34 herein can be specially designed to provide the working liquid WL to generate a higher flow rate and pressure to act on the initial liquid IL and the initial gas IG, and energy can be quickly and readily stored in the first container 12 and the second containers 14. The pump 34 is disposed between the first pipe 6 and the liquid source 2, as an example. However, the pump 34 may instead be disposed at at least one of the first spaces SP1, the second spaces SP2, the first tubes 16, the second tubes 18, between the first tubes 16 and the first containers 12, between the second tubes 18 and the second containers 14, the first pipe 6, the second pipe 8, between the second pipe 8 and the liquid source 2, and between the second pipe 8 and the converter 2. The pump 34 regulates the working liquid WL of the liquid source 2 to enter the energy storage 10".

The valve bodies 36, 36' can provide an open mode and a closed mode, manually and automatically. The automatic control can be done via a control signal CS. The control signal CS can be generated from the controller 38. Moreover, in the open mode, the working fluid WL, the initial liquid IL and the initial gas IG can pass through the valve bodies 36, 36'. In the closed mode, the working fluid WL, the initial liquid IL and the initial gas IG are stopped by the valve bodies 36, 36'. As illustrated in FIG. 7, the valve body 36 is between the first pipe 6 and the liquid source 2, and the valve body 36' between the first pipe 6 and the converter 4. However, the valve bodies 36, 36' may also be disposed at at least one of the first containers 12, the second containers 14, the first tubes 16, the second tubes 18, between the first tubes 16 and the first containers 12, between the second tubes 18 and the second containers 14, the first pipe 6, the second pipe 8, between the second pipe 8 and the liquid source 2, and between the second pipe 8 and the converter 4.

The controller 38 can receive the sensing signal SS generated by the pressure sensor 32 from sensing the pressure generated by, for example, the working fluid WL, the initial liquid IL or the initial gas IG. The controller 38 generates the control signal CS according to the sensing signal SS to operate the valve bodies 36, 36' to further execute the open mode or the closed mode. In an embodiment, the controller 38 outputs the control signal CS to operate the valve body 36 to control the initial gas IG at a predetermined pressure, and when the initial gas IG has a predetermined pressure, the initial gas IG stops being compressed.

In an embodiment, the controller 38 can communicate with a control program APP to allow the energy storages 102, 104, 106 and 108 to store the first pressure energy FPE or convert the second pressure in a synchronous manner. For example, the controller 38 controls the valve body 36 so that the four energy storages 102, 104, 106 and 108 can simultaneously store about four times the first pressure energy FPE, or the four energy storages 102, 104, 106 and 108 can simultaneously release about four times the second pressure energy SPE.

In embodiment, the controller 38 can also communicate with the control program APP to allow the energy storages 102, 104, 106 and 108 to store the first pressure energy FPE and convert the second pressure energy SPE asynchronously. For example, the controller 38 controls the valve body 36 or individually controllable valves at connection ports 62 (not shown) so that any of the energy storages 102, 104, 106 and 108 can independently store or release energy. In other words, the controller 38 can select one, more or all of the energy storages to drive the converter 4 to generate one or several times the electrical energy or extend the duration for the electrical energy E to generate electricity.

In an embodiment, the controller 38 can monitor the amount of electrical energy E generated. For example, when an abnormality (such as insufficiency or overload) occurs in the electric power, the controller 38 issues or generate a notification regarding the abnormality.

In an embodiment, the controller 38 is capable of configuring electrical energy E, so as to supply electrical energy required in the energy storage 10 to achieve the purpose of self-generation and self-supply.

In an embodiment, the energy storage 10" further includes an extended energy storage unit 40 connected to the converter 4 to store electrical energy E. The extended energy storage unit 40 may be, for example, a storage battery, a secondary battery, a supercapacitor, or the like.

Figure 10:
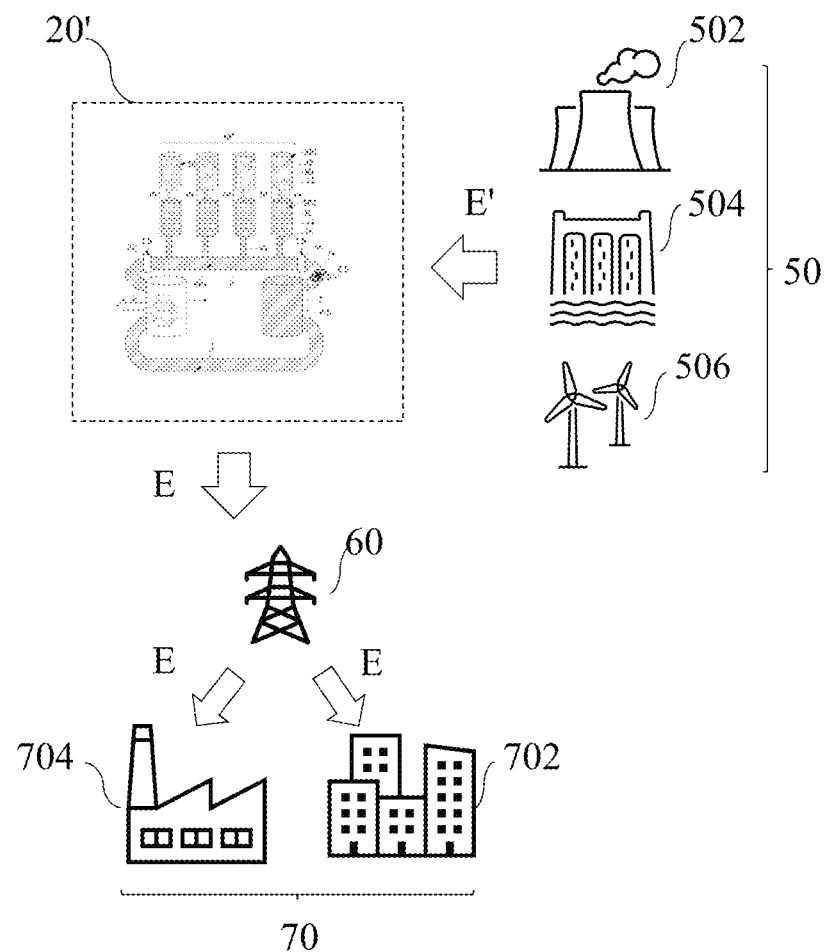
FIG. 10 is a schematic diagram illustrating the application of the energy storage system of FIG. 7 of a power network in accordance with some embodiments.

FIG. 10 is a schematic diagram illustrating an application of the energy storage system 20' to a power network in accordance with some embodiments. The energy storage system 20' is used as the energy storage device of a current power generation source 50. For example, the power generation source 50 may be thermal power generation 502, hydroelectric power generation 504 or wind power generation 506, nuclear power, geothermal energy, tidal energy, etc. The power generation source 50 generates electrical energy E', and the electrical energy E' can further drive the pump 34 of the heterogeneous pressure media and interactive actuation energy storage system 20' to allow the pump 34 to operate the working fluid WL to store energy in the energy storage 10". Based on the power demand of the electrical energy 70 (such as residential electricity 702, industrial electricity 704, etc.), the energy storage 10" can be matched with or support the power generation source 50, or be the main alternative power source, supplying the electrical energy E to the electrical energy demand 70 through an electric power network 60 at any time.

Figure 8:
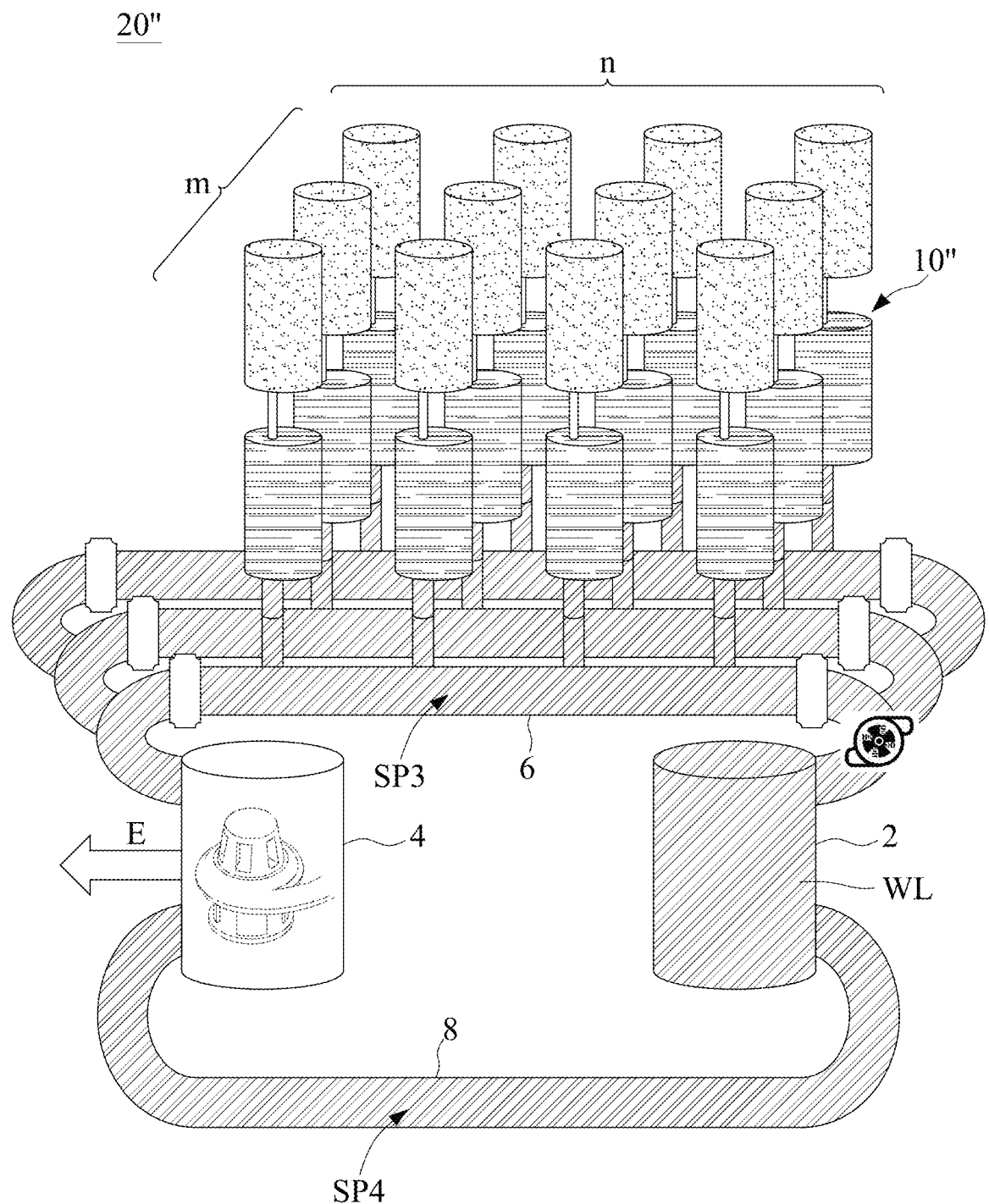
FIG. 8 is a three-dimensional schematic diagram of the energy storage system in accordance with some embodiments.

In an embodiment, the energy storage system 20" can contain n×m energy storages 10", as shown in FIG. 8, which is a three-dimensional schematic diagram of the energy storage system 20" in accordance with some embodiments.

Figure 9:
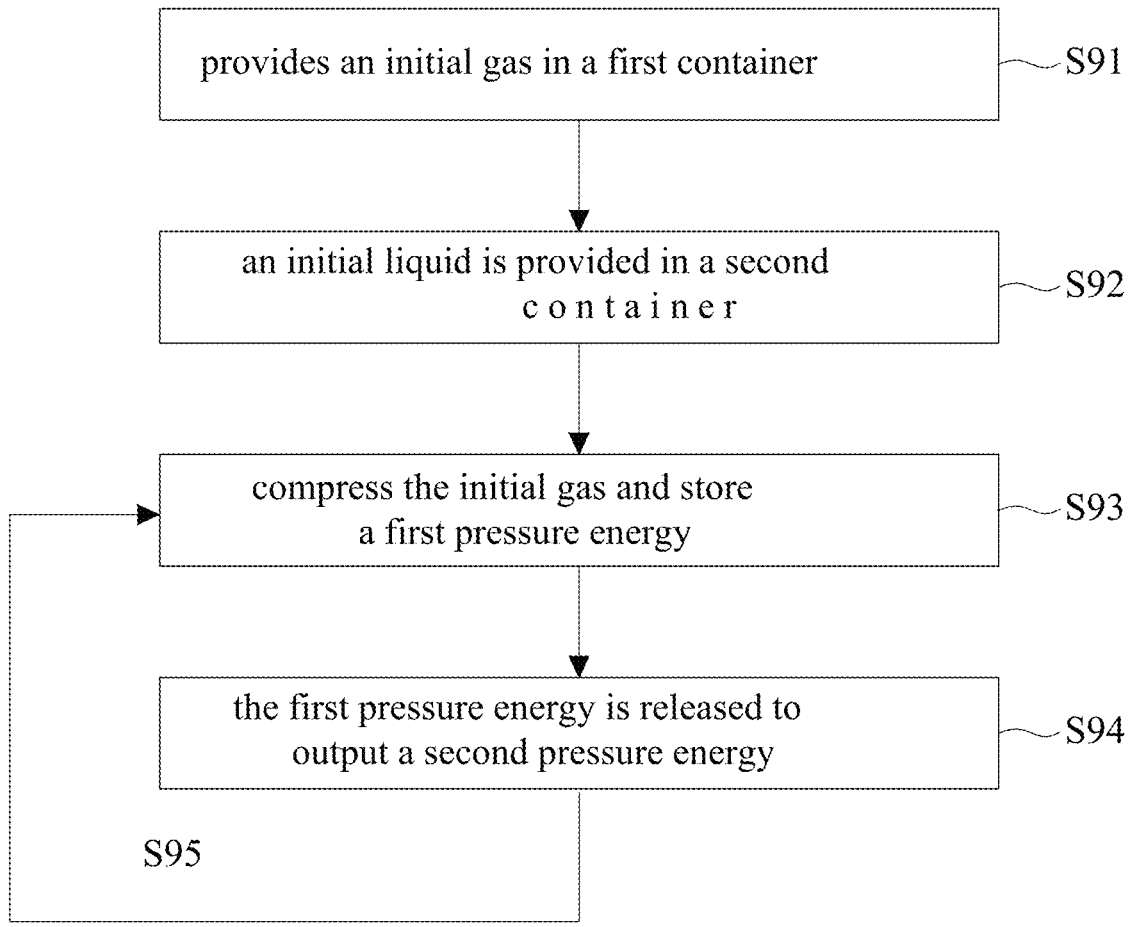
FIG. 9 is a schematic flow chart of a method for energy storage using a heterogeneous pressure media and interactive actuation in accordance with some embodiments.

FIG. 9 is a schematic flow chart of an energy storage method using heterogeneous pressure media and interactive actuation in accordance with some embodiments. In FIG. 9, the method starts at Step S91, which provides an initial gas in a first container.

At Step S92, an initial liquid is provided in a second container.

At Step S93, a working liquid is supplied to the second container to drive the initial liquid to compress the initial gas and store a first pressure energy.

At Step S94, the first pressure energy is released to drive the initial liquid to work on the working fluid to output a second pressure energy.

At Step S95, Steps S93 to S94 are repeatedly performed to act between the first pressure energy and the second pressure energy to output energy. For example, the second pressure energy is used to drive a converter (such as a liquid pump, a turbo pump, liquid generator, liquid turbine generator, hydro turbine generator) to generate electricity.

In an embodiment, after Step S95, the working fluid is recovered to be applied to the second container again to form a closed system in which the working fluid can be repeatedly used.

In utilization, the devices and systems are used to store and release energy so that such stored energy can be used on-demand.

In operation, a system converts an electrical energy into a potential energy or compressed air energy, storing the converted energy, and releasing the stored energy when in-demand.

The present invention has been disclosed in preferred embodiments above, but those skilled in the art should understand that this embodiment is only used to describe the present invention and should not be construed as limiting the scope of the present invention. It should be noted that all changes and substitutions equivalent to this embodiment should be included in the scope of the present invention. Therefore, the protection scope of the present invention shall be defined by the scope of the patent application.

What is claimed is:

1. An energy storage system comprising:
   a first container forming a first space to store an initial gas;
   a second container connected to one side of the first container and having a second space to store an initial liquid;
   when in a first operation mode of the energy storage system, a working fluid is injected into the second space, so that the working fluid drives the initial liquid to flow toward the first space, and further continuously compresses the initial gas in the first space until the initial gas in the first space reaches a predetermined pressure, thereby enabling the first container to store a first pressure energy;
   when in a second operation mode, the initial gas continuously expands to drive the initial liquid to discharge, so as to convert the first pressure energy to a second pressure energy for driving a converter to generate electricity;
   a first tube providing a first end and a third end, wherein the first end is coupled to the first container and the third end is coupled to the second container.

2. The energy storage system of claim 1, further comprising a second tube providing a second end and a fourth end, the second end coupled to the second container and the fourth coupled to the converter and a liquid source.

3. The energy storage system of claim 1, wherein the first container and the second container are at least one of a cylindrical tank, a polygonal tank, and a honeycomb tank.

4. The energy storage system of claim 1, further comprising a third tube disposed at the first container, wherein one end of the third tube is coupled to the first space and the other end of the third tube receives an external gas to supplement the initial gas.

5. The energy storage system of claim 1, further comprising a hole cover disposed at the first container, wherein the first space is connected to an outside space of the first container when the hole cover is open, and the first space is blocked from connection to the outside space of the first container when the hole cover is closed.

6. The energy storage system of claim 1, further comprising a maintenance pipe disposed between the first container and the second container, wherein the first space is connected to the second space when the maintenance pipe is opened, and the first space is blocked from connecting to the second space when the maintenance pipe is closed.

7. The energy storage system of claim 1, further comprising a pump for adjusting the flow rate of the working fluid or the initial fluid.

8. The energy storage system of claim 1, further comprising a valve body which provides an open mode and a closed mode, wherein when in the open mode, the working fluid, the initial liquid or the initial gas passes through the valve body, and wherein when in the closed mode, the working liquid, the initial liquid or the initial gas is stopped by the valve body.

9. The energy storage system of claim 8, further comprising a controller which outputs a control signal to operate the valve body to control the initial gas at the predetermined pressure, and when the initial gas has the predetermined pressure, the initial gas stops being compressed.

10. A heterogeneous pressure media and interactive actuation energy storage system comprising:
   a plurality of heterogeneous pressure media and interactive actuation modules, wherein each of the heterogeneous pressure media and interactive actuation modules includes:
      a first container having a first space storing an initial gas; and
      a second container coupled with one side of the first container and having a second space storing an initial liquid;
   a liquid source storing a working liquid;
   a pump disposed between the liquid source and the plurality of heterogeneous pressure media and interactive actuation modules, wherein the pump regulates a speed or an amount of the working liquid entering the plurality of heterogeneous pressure media and interactive actuation modules;
   a converter receiving and outputting the working fluid;
   a first pipe forming a third space, the first pipe having a plurality of container connection ports, a first connection point and a third connection point, wherein each of the container connection ports couples with each of the second spaces and the third space, wherein the first connection point and the third connection point are formed at the two ends of the first pipe, wherein the first connection point is coupled to a first end of the liquid source, and wherein the third connection point is coupled to a first end of the converter; and
   a second pipe forming a fourth space, a first end of the second pipe is coupled with a second end of the converter and a second end of the second pipe is coupled to a second end of the liquid source;
   when in a first operation mode, the working liquid is controlled by the pump and injected into the second space through the first pipe, so that the working liquid drives the initial liquid to flow toward the first space, thereby continuously compressing the initial gas in the first space until the initial gas reaches a predetermined pressure, further causing the first container to store a first pressure energy; and
   when in a second operation mode, the initial gas is controlled by the pump and continuously expanded to drive the initial liquid moving toward and discharge from the first pipe, so that the first pressure energy becomes a second pressure energy, and wherein the initial liquid causes the working liquid driving the converter to generate electricity.

11. The heterogeneous pressure media and interactive actuation energy storage system of claim 10, further comprising a pressure sensor generating a sensing signal by sensing a pressure generated by the working fluid, the initial liquid, the initial gas, or a combination thereof.

12. The heterogeneous pressure media and interactive actuation energy storage system of claim 10, further comprising a valve system configured to be in an open mode or a close mode, wherein in the open mode, the working fluid, the initial fluid and the initial gas are able to pass through the valve body, and wherein in the close mode, the working liquid, the initial liquid and the initial gas are stopped by the valve body.

13. The heterogeneous pressure media and interactive actuation energy storage system of claim 10, further comprising a pressure sensor, a valve body and a controller, wherein the pressure sensor and the valve body are connected to the controller, wherein the controller is configured to receive a sensing signal from the pressure sensor, and wherein the controller is configured to generates a control signal according to the sensing signal to operate the valve body to further execute the open mode or the close mode.

14. The heterogeneous pressure media and interactive actuation energy storage system of claim 13, wherein the controller is configured to output the control signal to operate the valve body causing the initial gas to reach at the predetermined pressure.

15. The heterogeneous pressure media and interactive actuation energy storage system of claim 13, wherein the controller is configured to execute a control program to control the heterogeneous pressure media and interactive actuation modules synchronously storing the first pressure energy.

16. The heterogeneous pressure media and interactive actuation energy storage system of claim 13, wherein the controller is configured to generate a notification when the controller senses an abnormal status.

17. The heterogeneous pressure media and interactive actuation energy storage system of claim 10, further including an extended energy storage unit coupled with the converter to store the electrical energy.

18. An energy storage system comprising:
   a first container forming a first space to store an initial gas;
   a second container connected to one side of the first container and having a second space to store an initial liquid;
   when in a first operation mode of the energy storage system, a working fluid is injected into the second space, so that the working fluid drives the initial liquid to flow toward the first space, and further continuously compresses the initial gas in the first space until the initial gas in the first space reaches a predetermined pressure, thereby enabling the first container to store a first pressure energy;
   when in a second operation mode, the initial gas continuously expands to drive the initial liquid to discharge, so as to convert the first pressure energy to a second pressure energy for driving a converter to generate electricity;
   a second tube providing a second end and a fourth end, the second end coupled to the second container and the fourth coupled to the converter and a liquid source.

19. The energy storage system of claim 18, further comprising a first tube providing a first end and a third end, wherein the first end is coupled to the first container and the third end is coupled to the second container.

20. The energy storage system of claim 18, wherein the first container and the second container are at least one of a cylindrical tank, a polygonal tank, and a honeycomb tank.

21. The energy storage system of claim 18, further comprising a third tube disposed at the first container, wherein one end of the third tube is coupled to the first space and the other end of the third tube receives an external gas to supplement the initial gas.

22. The energy storage system of claim 18, further comprising a hole cover disposed at the first container, wherein the first space is connected to an outside space of the first container when the hole cover is open, and the first space is blocked from connection to the outside space of the first container when the hole cover is closed.

23. The energy storage system of claim 18, further comprising a maintenance pipe disposed between the first container and the second container, wherein the first space is connected to the second space when the maintenance pipe is opened, and the first space is blocked from connecting to the second space when the maintenance pipe is closed.

24. The energy storage system of claim 18, further comprising a pump for adjusting the flow rate of the working fluid or the initial fluid.

25. The energy storage system of claim 18, further comprising a valve body which provides an open mode and a closed mode, wherein when in the open mode, the working fluid, the initial liquid or the initial gas passes through the valve body, and wherein when in the closed mode, the working liquid, the initial liquid or the initial gas is stopped by the valve body.

26. The energy storage system of claim 25, further comprising a controller which outputs a control signal to operate the valve body to control the initial gas at the predetermined pressure, and when the initial gas has the predetermined pressure, the initial gas stops being compressed.

27. An energy storage system comprising:
a first container forming a first space to store an initial gas;
a second container connected to one side of the first container and having a second space to store an initial liquid;
when in a first operation mode of the energy storage system, a working fluid is injected into the second space, so that the working fluid drives the initial liquid to flow toward the first space, and further continuously compresses the initial gas in the first space until the initial gas in the first space reaches a predetermined pressure, thereby enabling the first container to store a first pressure energy;
when in a second operation mode, the initial gas continuously expands to drive the initial liquid to discharge, so as to convert the first pressure energy to a second pressure energy for driving a converter to generate electricity;
a maintenance pipe disposed between the first container and the second container, wherein the first space is connected to the second space when the maintenance pipe is opened, and the first space is blocked from connecting to the second space when the maintenance pipe is closed.

28. The energy storage system of claim 27, further comprising a first tube providing a first end and a third end, wherein the first end is coupled to the first container and the third end is coupled to the second container.

29. The energy storage system of claim 27, further comprising a second tube providing a second end and a fourth end, the second end coupled to the second container and the fourth coupled to the converter and a liquid source.

30. The energy storage system of claim 27, wherein the first container and the second container are at least one of a cylindrical tank, a polygonal tank, and a honeycomb tank.

31. The energy storage system of claim 27, further comprising a third tube disposed at the first container, wherein one end of the third tube is coupled to the first space and the other end of the third tube receives an external gas to supplement the initial gas.

32. The energy storage system of claim 27, further comprising a hole cover disposed at the first container, wherein the first space is connected to an outside space of the first container when the hole cover is open, and the first space is blocked from connection to the outside space of the first container when the hole cover is closed.

33. The energy storage system of claim 27, further comprising a pump for adjusting the flow rate of the working fluid or the initial fluid.

34. The energy storage system of claim 27, further comprising a valve body which provides an open mode and a closed mode, wherein when in the open mode, the working fluid, the initial liquid or the initial gas passes through the valve body, and wherein when in the closed mode, the working liquid, the initial liquid or the initial gas is stopped by the valve body.

35. The energy storage system of claim 34, further comprising a controller which outputs a control signal to operate the valve body to control the initial gas at the predetermined pressure, and when the initial gas has the predetermined pressure, the initial gas stops being compressed.

36. An energy storage system comprising:
a first container forming a first space to store an initial gas;
a second container connected to one side of the first container and having a second space to store an initial liquid;
when in a first operation mode of the energy storage system, a working fluid is injected into the second space, so that the working fluid drives the initial liquid to flow toward the first space, and further continuously compresses the initial gas in the first space until the initial gas in the first space reaches a predetermined pressure, thereby enabling the first container to store a first pressure energy;
when in a second operation mode, the initial gas continuously expands to drive the initial liquid to discharge, so as to convert the first pressure energy to a second pressure energy for driving a converter to generate electricity;
a valve body which provides an open mode and a closed mode, wherein when in the open mode, the working fluid, the initial liquid or the initial gas passes through the valve body, and wherein when in the closed mode, the working liquid, the initial liquid or the initial gas is stopped by the valve body;
a controller which outputs a control signal to operate the valve body to control the initial gas at the predetermined pressure, and when the initial gas has the predetermined pressure, the initial gas stops being compressed.

37. The energy storage system of claim 36, further comprising a first tube providing a first end and a third end, wherein the first end is coupled to the first container and the third end is coupled to the second container.

38. The energy storage system of claim 36, further comprising a second tube providing a second end and a fourth end, the second end coupled to the second container and the fourth coupled to the converter and a liquid source.

39. The energy storage system of claim 36, wherein the first container and the second container are at least one of a cylindrical tank, a polygonal tank, and a honeycomb tank.

40. The energy storage system of claim 36, further comprising a third tube disposed at the first container, wherein one end of the third tube is coupled to the first space and the other end of the third tube receives an external gas to supplement the initial gas.

41. The energy storage system of claim 36, further comprising a hole cover disposed at the first container, wherein the first space is connected to an outside space of the first container when the hole cover is open, and the first space is blocked from connection to the outside space of the first container when the hole cover is closed.

42. The energy storage system of claim 36, further comprising a maintenance pipe disposed between the first container and the second container, wherein the first space is connected to the second space when the maintenance pipe is opened, and the first space is blocked from connecting to the second space when the maintenance pipe is closed.

43. The energy storage system of claim 36, further comprising a pump for adjusting the flow rate of the working fluid or the initial fluid.

* * * * *